M. A. ESPIRAT & E. SAUSE.
FILTER.
No. 47,251. Patented Apr. 11, 1865.
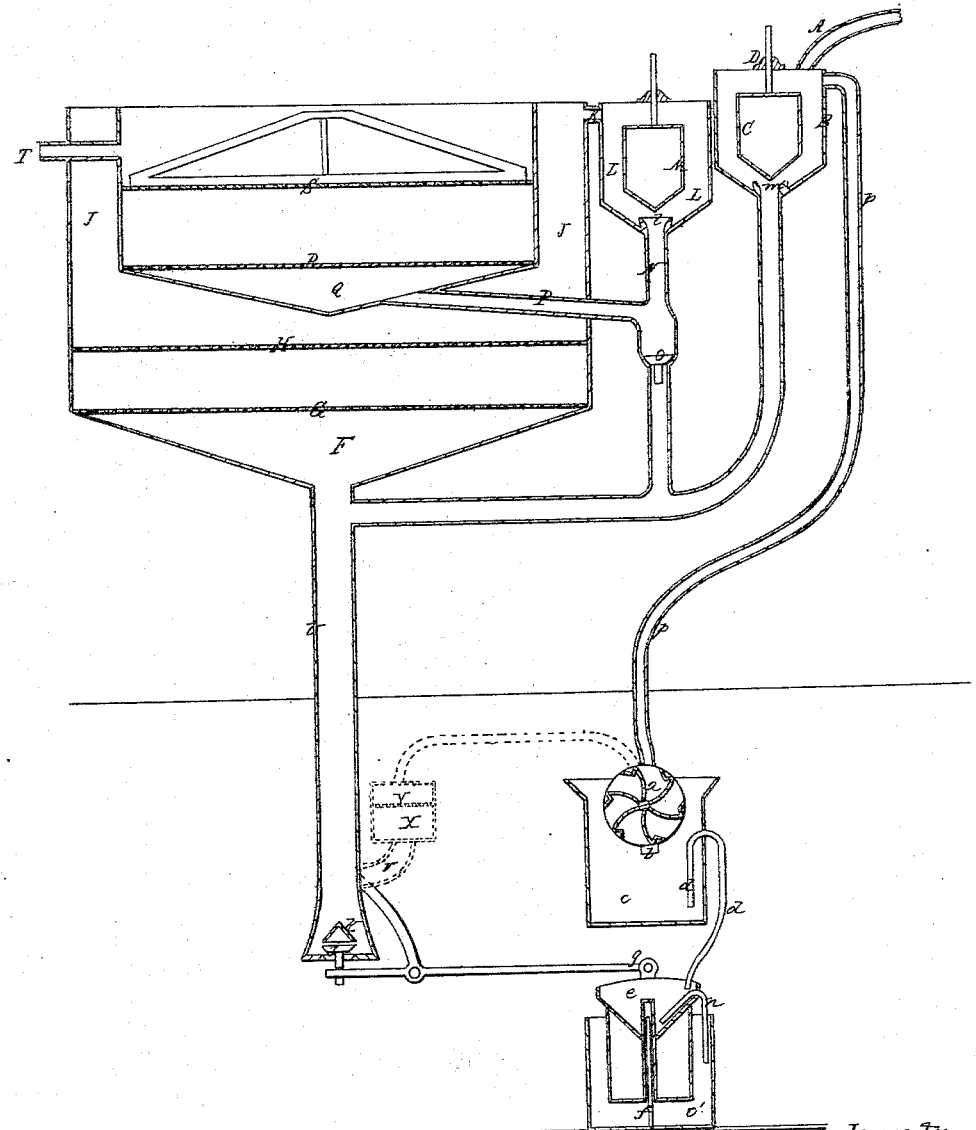

UNITED STATES PATENT OFFICE.

ETIENNE SAUSE AND ANTOINE ESPIRAT, OF MARSEILLES, FRANCE.

IMPROVEMENT IN FILTERS.

Specification forming part of Letters Patent No. 47,251, dated April 11, 1865.

*To all whom it may concern:*

Be it known that we, ETIENNE SAUSE and ANTOINE ESPIRAT, have invented a new and useful Self-Cleaning Filter; and we do hereby declare that the following is a full and exact description thereof, so as to enable others skilled in the art to make and use our invention.

The nature of our invention consists in constructing a filter in such a manner that it cleans itself.

The disadvantages of filters as made heretofore are that they do not effect a perfect clarification, and that the filtering substances remain impregnated with the residues of the fluids to be clarified. Those filters have to be taken apart for the purpose of cleaning them, and while they are being cleaned another set of filters is required for the ordinary filtering purposes.

The water or other fluid to be filtered enters through the tube A into the reservoir (containing the float) B. As the water enters the float C rises perpendicularly, being guided during such motion by a collar, D, through which passes the rod of the float. The water is thus left free to enter rapidly into the recipient F, and, on account of its upward pressure, it penetrates the filtering substances supported by the grates G and H. This constitutes the first filtering process. The water, thus deprived of the greater portion of its grosser impurities, passes around the filter J and through the tube K into the reservoir L, containing the float M. The float M is made to rise by the force of the water in the same manner as the float C. The water then enters the tube N, which is hermetically closed at its lower end by means of a valve, O. The water then rises again in tube P and is received in the recipient Q. It now comes in contact with the filtering substances which rest against the grates R and S. The water is now perfectly clarified, and can be drawn by means of faucet T.

An inverted float may be used in place of the valve O.

*p* represents a tube, through which a volume of water is allowed to pass constantly from the reservoir B. The volume of water thus passing through can be diminished or augmented by means of a regulator. This volume of water is then received by a bucket-wheel, *a*, the equilibre of which is maintained by means of a balance-weight attached to the wheel at *b*. As soon as several of the buckets are filled they will descend on account of the weight and will throw the water off. The water accumulates thus in the recipient *c*, and when it has reached a certain *niveau* it will be drawn up by the siphon *d*, which empties the water into the balance-weight *e*. When the latter has received all the water, it can hold it slides along the rod *f* and drags along the end of lever *g*, thus opening the valve *j*. The point of support of the lever *g* being close to the valve *j*, the latter opens instantly on the descent of the balance-weight, and is protected (while open) by the piece *k* against the effect of the momentum of the water rushing in. The water in the recipients F and Q, no longer being confined therein, rushes with great force through the tubes P and U and forces open the valve O, thus gaining a passage out through the valve *j*. The floats C and M come to rest against their supports *l* and *m*, that may be made of leather, caoutchouc, or other suitable material, and thus the passage of water, as well as air, is at once and suddenly stopped. A portion of the water already filtered rushes violently back through the filtering substances, and carries with it the sediments left there.

The valve *j* closes itself automatically in the following manner: The balance-weight *e*, while precipitately descending, empties into the recipient O', (by means of siphon *n*,) and, thus lightened, it reascends and closes the valve *j*. The recipient O' is provided with an opening at the bottom or with a siphon, for the purpose of allowing the water to flow off.

The same purpose of cleaning the filters may be effected by the application of a recipient, X, (shown in red lines on the drawings,) which communicates with pipe U by means of branch V. A sieve, Y, is arranged within the recipient X, and the water passes from the pipe U through pipe V, box X, and pipe Z, onto the wheel *a*, which results in a self-clearing operation of the filter, as above described.

Having thus fully described the nature of our invention, what we claim herein as new, and desire to secure by Letters Patent, is—

1. The combination of the filters G H and

R S, with their reservoirs B and L, when constructed and operated substantially as and for the purposes described.

2. In combination with the filters and their reservoirs above described, the self-clearing apparatus, consisting of pipe $p$, reservoirs $c$ $e$ $O'$, wheel $a$, and siphons $d$ $n$, when constructed and operated as herein described.

3. In combination with the filters and the reservoirs $c$ $e$ $O'$ and their operating devices, the recipient X, and pipes V Z, as substitutes for the pipe $p$, as and for the purposes set forth.

ETNE. SAUSE.
ESPIRAT, ANTOINE.

Witnesses:
CHARLES CHABERT,
T. MATIGNON.